(12) United States Patent
Rudolph

(10) Patent No.: US 7,889,760 B2
(45) Date of Patent: Feb. 15, 2011

(54) SYSTEMS AND METHODS FOR SENDING BINARY, FILE CONTENTS, AND OTHER INFORMATION, ACROSS SIP INFO AND TEXT COMMUNICATION CHANNELS

(75) Inventor: Eric Rudolph, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1186 days.

(21) Appl. No.: 10/975,819

(22) Filed: Oct. 28, 2004

(65) Prior Publication Data
US 2005/0243747 A1 Nov. 3, 2005

Related U.S. Application Data

(60) Provisional application No. 60/567,152, filed on Apr. 30, 2004.

(51) Int. Cl.
*H04J 3/16* (2006.01)
(52) U.S. Cl. .................. 370/466; 455/414.4
(58) Field of Classification Search ............ 370/352, 370/353
See application file for complete search history.

(56) References Cited

U.S. PATENT DOCUMENTS

| | | | | |
|---|---|---|---|---|
| 5,615,379 | A * | 3/1997 | Wehle | 717/110 |
| 5,923,846 | A | 7/1999 | Gage et al. | |
| 6,725,281 | B1 | 4/2004 | Zintel et al. | |
| 6,865,609 | B1 * | 3/2005 | Gubbi et al. | 709/230 |
| 6,901,496 | B1 * | 5/2005 | Mukund et al. | 711/169 |
| 7,206,932 | B1 * | 4/2007 | Kirchhoff | 713/152 |
| 2002/0069218 | A1 * | 6/2002 | Sull et al. | 707/501.1 |
| 2002/0075880 | A1 * | 6/2002 | Dolinar et al. | 370/401 |
| 2004/0107238 | A1 * | 6/2004 | Orton et al. | 709/200 |
| 2004/0148332 | A1 * | 7/2004 | Parolkar et al. | 709/200 |
| 2005/0198120 | A1 * | 9/2005 | Reshef et al. | 709/203 |

FOREIGN PATENT DOCUMENTS

WO  WO 02/087098 A1 * 10/2002

OTHER PUBLICATIONS

G. Vaudreuil. SMTP Service Extensions for Transmission of Large and Binary MIME Messages, Lucent Technologies, Dec. 2000. 12 pages.

J. Reynolds, R. Braden, S. Ginoza, A. De La Cruz. Internet Official Protocol Standards. Internet Engineering Task Force, Nov. 2002. 48 pages.

P. Kwiatkowski. A Base-85 Encoding Suitable for XML. Internet Engineering Task Force Internet-Draft, Sep. 2003. 13 pages.

J. Postel. RFC 765- File Transfer Protocol Specification, Jun. 1980. 54 pages.

(Continued)

*Primary Examiner*—Rafael Pérez-Gutiérrez
*Assistant Examiner*—Marcos Batista
(74) *Attorney, Agent, or Firm*—Lee & Hayes, PLLC

(57) ABSTRACT

The invention facilitates transmission of information across text communication channels in real time. A conversion component is provided that converts binary data into binary-as-text format, and parses converted binary data into packets for serial transmission over an SIP-connected messaging system via a text channel in the SIP-connected messaging system and/or an SIP information side-band channel.

19 Claims, 10 Drawing Sheets

OTHER PUBLICATIONS

D.J. Bernstein. FTP: File Transfer Protocol. Last Viewed on Jun. 20, 2005. 1 page http://cr.yp.to/ftp.html.

Chapter 10: Understanding the T.120 Standard. Microsoft Corporation, Last Updated: Dec. 10, 1999. 8 pages http://www.microsoft.com/windows/NetMeeting/Corp/reskit/Chapter10/default.asp.

H.323: Data. Advanced Science and Technology Institute. Last Viewed on Jun. 21, 2005. 4 pages http://ai3.asti.dost.gov.ph/h.323/data.htm.

Multipoint Binary File Transfer Protocol Draft Recommendation T.127. ITU-Telecommunication Standardization Sector, Mar. 14-23, 1995. 58 pages.

Multipoint Binary File Transfer Protocol. Last Viewed on Jun. 21, 2005. 5 pages http://penta2.ufrgs.br/h323/t127_visao.htm.

Korean Patent Application No. 10-1995-0046002 to Dell et al., having Publication date of Jul. 22, 1996 (w/ English Abstract page).

Korean Patent Application No. 10-1998-0049125 to Correale Jr. et al., having Publication date of Jul. 26, 1999 (w/ English Abstract page).

* cited by examiner

SYSTEMS AND METHODS FOR SENDING BINARY, FILE CONTENTS, AND OTHER INFORMATION, ACROSS SIP INFO AND TEXT COMMUNICATION CHANNELS

CROSS-REFERENCE TO RELATED APPLICATIONS

This application claims priority to U.S. Provisional Patent Application Ser. No. 60/567,152 entitled SYSTEMS AND METHODS FOR SENDING BINARY, FILE CONTENTS, AND OTHER INFORMATION, ACROSS SIP INFO AND TEXT COMMUNICATION CHANNELS and filed Apr. 30, 2004, the entirety of which is incorporated herein by reference.

TECHNICAL FIELD

This invention is related to communication in a computer environment, and, more particularly, to transmitting data packets, files, etc., over a text channel, such as a session initiation protocol (SIP) channel.

BACKGROUND OF THE INVENTION

The evolution of computers and networking technologies from high-cost, low-performance data processing systems to low-cost, high-performance communication, problem solving and entertainment systems has provided a cost-effective and time saving means to lessen the burden of performing every day tasks such as correspondence, bill paying, shopping, budgeting and information gathering. For example, a computing system interfaced to the Internet, via wire or wireless technology, can provide a user with a channel for nearly instantaneous access to a wealth of information from a repository of web sites and servers located around the world, at the user's fingertips.

Text-messaging systems have become prevalent in today's society and are widely used by a variety of communication systems. However, typical text-messaging systems are limited by the amount of data and/or size of a data transmission that they can handle, and thus limited to transmission of text-related data.

An unmet need exists in the art for systems and methods that facilitate packaging non-text information for transmission over text communication channels.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises a system that facilitates transmission of random binary data and/or a file's binary contents, via a text communication channel, between Internet-connected computers. In this manner, binary data can be converted to a format that is transmittable over, for example, a text messaging system, packaged in packets of a size that the messaging system permits, and transmitted serially for conversion back to binary format at a recipient client.

According to an aspect of the invention, a user (or user client) can submit a request to open a message system via a standard session initiation protocol (SIP). The SIP-connected message system can comprise a text channel that permits text data to be transmitted between users. Binary data can be converted into text format (e.g., according to ASCII protocols) and transmitted over the SIP-connected messaging system's text channel in packets that adhere to predetermined size constraints of the given text channel over which the binary-as-text data is being transmitted, in order to mitigate an over-taxing the relatively limited bandwidth of the text channel. The binary-as-text data can be sent using, for instance, a standard transmission control protocol (TCP) or a bilateral send-and-receive infrastructure, which transmits the binary-as-text data packets serially, thus ensuring that they will be received in a proper order for reformatting back to the original binary data sequence. In this manner, the present invention can provide a simplified means for transmission of complex data over extant communication channels of potentially limited bandwidth.

According to a related aspect of the invention, binary-as-text packet transmission can occur over an SIP information side-band channel. Additionally, any number of users can transmit and/or receive binary-as-text data via a plurality of SIP information side-band channels, and/or via the text channel of an SIP-connected messaging system described above.

According to another aspect of the invention, binary data can be encoded in a manner that facilitates stabilizing the binary-as-text data packet and mitigates potential misinterpretation of the binary-as-text data. Such can be achieved via, for example, stripping out "illegal" characters from the binary stream and prefixing the illegal characters with an "escape" character. The escape character itself can be further escaped, if desired (e.g., by a secondary escape prefix). For instance, illegal characters can comprise binary 0s, 10s, and 13s, which typically can be interpreted as "end-of-data," "new line," and "return," respectively. Such illegal characters can be stripped out of the binary code during conversion to text-format and replaced with an escape character, such as, for example, an "@" symbol.

According to yet another aspect of the invention, each packet of binary-as-text data can be prefixed with a protocol header that explains the packet contents. The protocol header is attached in addition to any header and/or prefix attached to the binary-as-text packet by the messaging system over which the packet is sent. In this manner, a receiving station can be informed of packet contents in order to distinguish the binary-as-text packet from other types of data packets.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
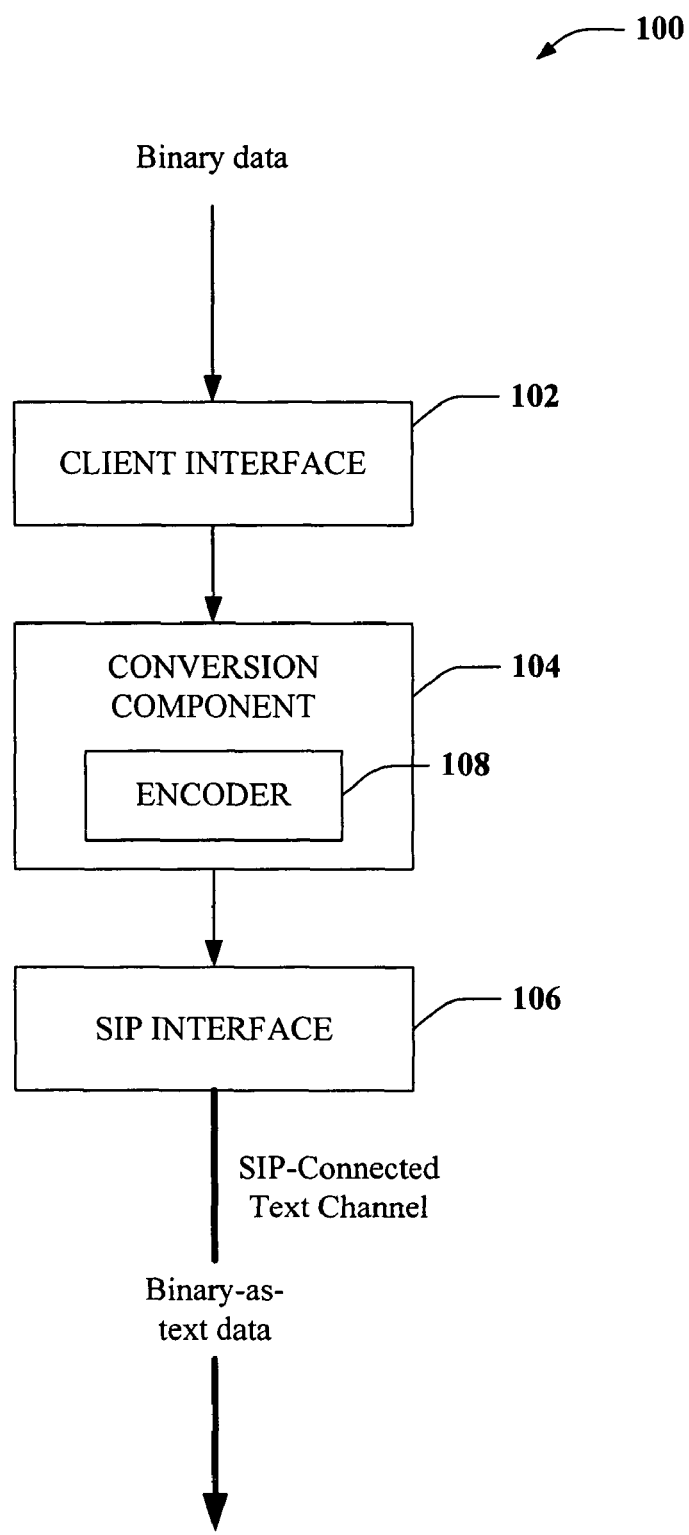
FIG. 1 is an illustration of a system 100 that facilitates transmitting binary data, file contents, etc., over a text communication channel.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention can be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

FIG. 1 is an illustration of a system 100 that facilitates transmitting binary data, file contents, etc., over a text communication channel. The system 100 can facilitate transfer of data and/or files related to, for example, cell phone ringers, backgrounds, game moves, such as, for example, chess and/or checkers, etc. The system 100 comprises a client interface 102 that can receive information from a sending client, and a conversion component 104 that can convert the input information into binary-as-text information for transmission through an SIP interface 106. Information that is received by the client interface 102 can be in any suitable format, and the conversion component 104 can convert the input information into binary format if necessary, and can convert the binary information into text-formatted information in order to output the binary-as-text information over a text communication channel, such as an SIP INFO side-band channel, an SIP TEXT channel, etc. An SIP is also known as a signaling protocol, or an application-layer protocol, and is employed to create communication sessions between participants. An SIP session can be initiated via an invitation, which typically comprises information descriptive of the particular session, which permits users to agree upon particular types of media through which communication can occur. An SIP can employ a proxy server to facilitate tracking user identity, location, call-routing protocols, etc. Conversion of binary data to binary-as-text data can involve an encoder 108 that is operatively associated with the conversion component 104. The SIP interface 106 can interface with the SIP TEXT channel and/or the SIP INFO side-band channel in order to transmit binary-as-text data to a receiving client.

Once in text format, the binary-as-text data can be packaged in units that conform to size restrictions associated with a particular text communication channel over which the binary-as-text data will be transmitted. Alternatively, the binary data can be parsed into predefined packet sizes prior to conversion to binary-as-text format. Additionally, the conversion component 104 can prefix a header to each binary-as-text packet, in addition to any header attached by the text messaging system. Finally, the binary-as-text data packets can be sent over the text messaging system. Because text messaging systems employ serial transmission protocols such as transmission control protocol(s) (TCP) and/or two-way send-and-receive transmission protocols, all packets can be sent serially from a sending client providing the input data, which facilitates reconstruction of a plurality of binary-as-text data packets as binary data at a receiving client. Although TCP is discussed herein as an exemplary transmission protocol, it is to be appreciated that any suitable serial transmission protocol can be utilized in conjunction with the subject invention.

Furthermore, the system 100 can operate in conjunction with existing systems, such that information sent as converted binary-as-text data can "piggyback" on a text message. For example, if a PowerPoint Presentation is sent as converted data, page flips by a first user can be transmitted as converted binary data as well, such that a second user can receive information associated with the pages in the presentation as well as the timing of page flips, etc. Additionally, because the presentation data is transmitted as binary-as-text data over the text messaging system, the presentation data does not require a separate firewall instruction, universal plug-and-play protocol, etc., but rather can use that which is provided with the text channel and/or text data packets thereon.

SIP is a signaling protocol for Internet conferencing, telephony, presence, events notification and instant messaging. The protocol initiates call setup, routing, authentication and other communication features to endpoints within an IP domain. SIP is a joint standard between at least two users to initiate a text messaging system, wherein upon agreement to initiate a text messaging system, the users can employ a different system to communicate. Once a communication channel is established, both parties can implement an SIP information side-band channel, which permits further information to be shared regarding what the users desire. The information side-band channel can be utilized in addition to, and/or in place of, the SIP connected text communication channel, to facilitate data and/or file transfer. The information channel is typically designed to be low-bandwidth. SIP information protocol requires all packets to have a certain header format that describes contents of a packet. The system 100 can insert an additional header with new definitions, place binary data in the packet, and describe what is in the binary data.

According to an aspect of the invention, a user (or user client) can submit a request to open a message system via a standard session initiation protocol (SIP). The SIP-connected message system can comprise a text channel that permits text data to be transmitted between users. A plurality of users can be connected via SIP-connected message channels, and a server (not shown), can be employed to facilitate communication there between.

For example, file transfer protocol (FTP) and the T.127 standard (part of the T.120 conferencing standards), are existing protocols for transferring files among connected users. The system 100 differs from such existing systems in that it is much less complex, is built upon and operates on an extant messaging system, and can utilize various protocols associated with the underlying text messaging system (e.g., predefined universal plug-and-play (UPNP) protocol(s) for firewall access so that no new UPNP need be created; security measures; bandwidth control, etc.) As such, the present invention can enhance, for example, conferencing applications.

The system 100 can comprise a real-time communication (RTC) engine, utilizing an RTC API, but is not limited thereto. For example, other messaging systems can be utilized for data transfer as well (e.g., common subscription-based messaging systems, freeware messaging systems, etc.). Thus, the herein described systems and methods provide a simplified manner of transferring binary data, files, etc., constructed on an existing messaging system. The RTC API allows establishment of, for example, a conventional text chat session via conventional of methods. Once a text session is established, conventional text chat sessions are somewhat limited with respect to the transfer of information from one user to another.

The following examples of RTC APIs are proffered in order to provide insight into establishment of a text session such as can be established in conjunction with aspects of the subject invention:

```
[helpstring("method SendMessage")]
HRESULT SendMessage(
[in] BSTR bstrMessageHeader,
[in] BSTR bstrMessage,
[in] LONG_PTR ICookie
);
[helpstring("Method SendInfo")]
HRESULT SendInfo(
[in] BSTR bstrInfoHeader,
[in] BSTR bstrInfo,
[in] LONG_PTR ICookie
);
```

It is to be appreciated, however, that non-RTC implementation of the system 100 can occur in a similar manner, but with a different protocol (described below). According to this example, the system 100 can operate over non-RTC text-based messaging systems as well. Thus, constructing the system 100 on RTC-based messaging systems does not limit the system to such messaging systems, but rather the system 100 can be designed to run on top of a different text-based system, with potentially better and/or different binary-as-text protocols.

Text-messaging methods generally incorporate string (character-based) information. In order to send binary data, the data must first be converted into a text-like format that will maintain its integrity during transmission and will not be misinterpreted by send or receive clients. Conversion into a text format by the conversion component 104 can involve Y-encoding (y-enc) and/or variants thereof by the encoder 108, which can encode data to send binary attachments via email, UUnet, etc. Y-enc strips out "illegal" characters from a binary stream (e.g., characters that can be misinterpreted in a newsreader or email program), and prefixes the stripped characters with an escape character. The escape character itself can also be escaped. The present invention is not limited to y-enc as a conversion means, but can employ other means as well (e.g., Base64, etc.). The system 100 can employ the escape technique as well, removing binary data representing 0, 10, and/or 13, from the stream, since these are typically interpreted as end-of-data, return, and line-feed, respectively. An '@' symbol, for example, can be utilized as the escape character. Thus, conversion to text format can occur in accordance with ASCII (American Standard Code for Information Interchange) protocols, a brief discussion of which is presented herein to facilitate understanding of the subject invention.

ASCII comprises protocols that have been standardized for the vast majority of microcomputer components, equipment, etc. A standard ASCII character set can comprise 128 decimal numbers (e.g., 0-127) each of which is assigned a specific letter, number, punctuation mark, or special character (e.g., the character "#" is designated by a decimal value of 35, etc.). For example, the decimal values 65 through 90 designate the alphabetical letters A-Z respectively, the decimal values 48 through 57 designate the numerals 0-9 respectively, etc. Additionally, an Extended ASCII character set has been developed to permit binary expression of a wider range of textual characters, such as additional special characters (e.g., Å, Æ, f, etc.), mathematical characters and/or operators (e.g., ±, ≈, etc.), graphic characters (e.g., ▌, ▓, etc.), foreign characters (e.g., π, τ, μ, etc.), etc. Such characters are designated by an additional 128 decimal numbers ranging from 128-255. These and other ASCII designations can be adopted and/or employed by the subject systems and methodologies in order to convert binary data into binary as text data for transmission.

Text messaging systems typically do not anticipate messages comprising large amounts of data. Normally they are very small in length (<256 bytes). Most text-messaging engines (like RTC) limit the size of the transmitted/received strings to something fairly small, potentially under 2K bytes. Because of this, binary-as-text data can be sent in small packets, and protocols can be provided on both send and receive ends of the communication system to facilitate reconstruction of the data at a receiving station. To ensure that a receiving client can identify and interpret the binary-as-text data, the conversion component 104 and associated encoder 108 can prefix each sent packet with a protocol header that describes the packet contents. This protocol header can be attached in addition to any header/prefix the messaging system itself attaches to the packet during transmission.

The following code-related examples are provided to facilitate understanding of the invention and are not intended to be interpreted in a limiting sense. An exemplary protocol header can be constructed as follows:

[COMMAND][SENDER#] [RECEIVER#] [PACKET#] [STREAM#] [bIsBinary] [LENGTH] [DATA]

wherein SENDER# can be any number and is sent as actual text. For example, 1001 is sent as the string "1001"; RECEIVER# can be any number; PACKET# is a numerical identifier indicating the packet being sent with the first packet identified as "0"; STATUS# designates the binary stream to which the packet refers (multiples can exist); bIsBinary is a "0" or a "1", provided to indicate whether binary-as-text data follows, or just text data; LENGTH is the length of data, as a string; and DATA indicates either text data or binary-as-text data.

Commands from sender-to-receiver can comprise, for instance:

```
s2r_request_to_send = 200
s2r_binary_xfer_start = 201
s2r_binary_xfer_packet = 202
s2r_binary_xfer_done = 203
s2r_cancel_sending = 204
```

A command (reply) from receiver-to-sender can comprise, for example:

```
r2s_cancel_sending = 300
r2s_okay_to_start_sending = 301
```

Each of following exemplary commands can be employed to populate various fields in a protocol header:

```
s2r_request_to_send
sender, receiver = valid
packet = 0
stream = new stream #
bIsBinary = 0
Data = filename of what is being sent
s2r_binary_xfer_start
sender, receiver = valid
packet = 0
stream = established stream ID
bIsBinary = 0
Data = filename of what is being sent (repeated!)
s2r_xfer_packet
sender, receiver = valid
packet = increasing from 0
stream = established stream ID
bIsBinary = 1
Data = packet data
s2r_xfer_done
sender, receiver = valid
packet = 0
stream = established stream ID
bIsBinary = 0
Data = 0
s2r_cancel_sending
sender, receiver = valid
packet = 0
stream = established stream ID
bIsBinary = 0
Data = filename of what is being sent
r2s_okay_to_start_sending
sender, receiver = valid
packet = 0
stream = received stream ID during request
bIsBinary = 0
Data = 0
```

Upon receipt of serially transmitted packets comprising binary-as-text data, a receiving client can reconstruct the original binary data in a manner approximately opposite to the manner in which binary data is converted into binary-as-text data (e.g., a decoder can be employed, a reverse-ASCII translation can be implemented, etc.).

Figure 2:
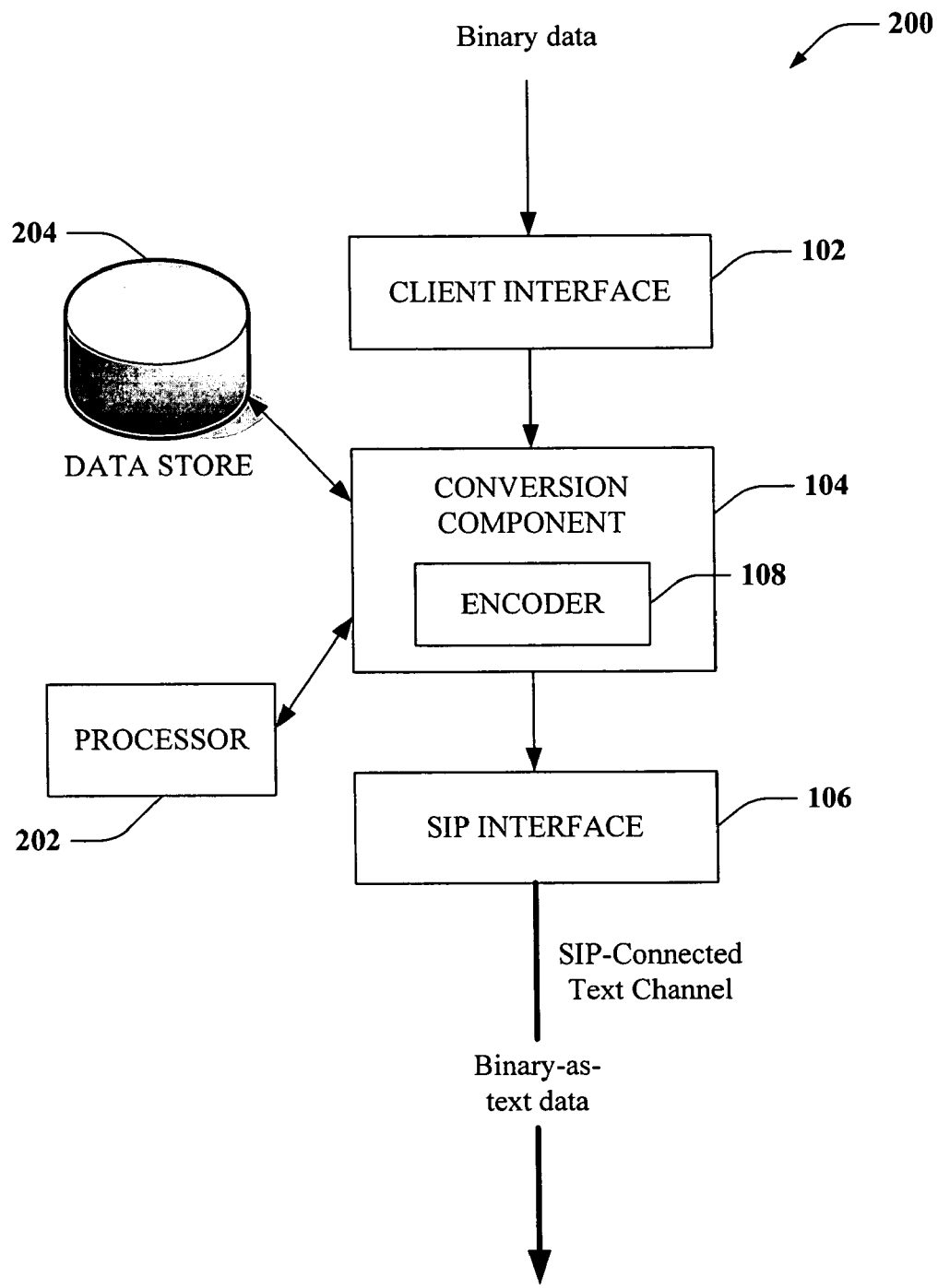
FIG. 2 is an illustration of a system 200 comprising a processor and a memory, which facilitates transmitting binary data over a text communication channel.

FIG. 2 is an illustration of a system 200 that facilitates transmitting binary-as-text data over a text messaging system. The system 200 comprises a client interface 102 that interfaces with a sending client and receives data there from for conversion and eventual transmission via an SIP channel as described with respect to FIG. 1. The system 200 further comprises a conversion component 104 that converts binary data to binary-as-text data in conjunction with an encoder 108, and an SIP interface 106 that interfaces with an SIP channel (e.g., SIP text channel, SIP information side-band channel, etc.) to transmit packaged binary-as-text data to a receiving client, as described supra. Once in text format, the binary-as-text data can be packaged by the conversion component 104 into units that conform to size restrictions associated with a particular text communication channel over which the binary-as-text data will be transmitted. Furthermore, the conversion component 104 can prefix a header to each binary-as-text packet, in addition to any header attached by the text messaging system. Finally, the binary-as-text data packets can be sent over the text messaging system. Because text messaging systems employ transmission control protocol(s) (TCP), all packets can be sent serially from a sending client, which facilitates reconstruction of a plurality of binary-as-text data packets as binary data at a receiving client.

The conversion component 104 is operatively associated with a processor 202 that analyzes data received and/or generated by the conversion component 104, and a memory 204 that stores information associated with system operations. It is to be appreciated that the processor 202 can be a processor dedicated to analyzing information received by the conversion component, a processor that controls one or more components of the system 200, and/or a process that both analyzes information received by the conversion component 104 and controls one or more components of the system 200.

The memory 204 can additionally store protocols associated with converting data between binary and binary-as-text formats, such that the system 200 can be employed at a sending client and at a receiving client, and can operate to generate binary-text data for transmission over a text messaging system and to receive binary-as-text data over a text messaging system and identify and interpret such received information for presentation to a receiving client. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory of the present systems and methods is intended to comprise, without being limited to, these and any other suitable types of memory.

Figure 3:
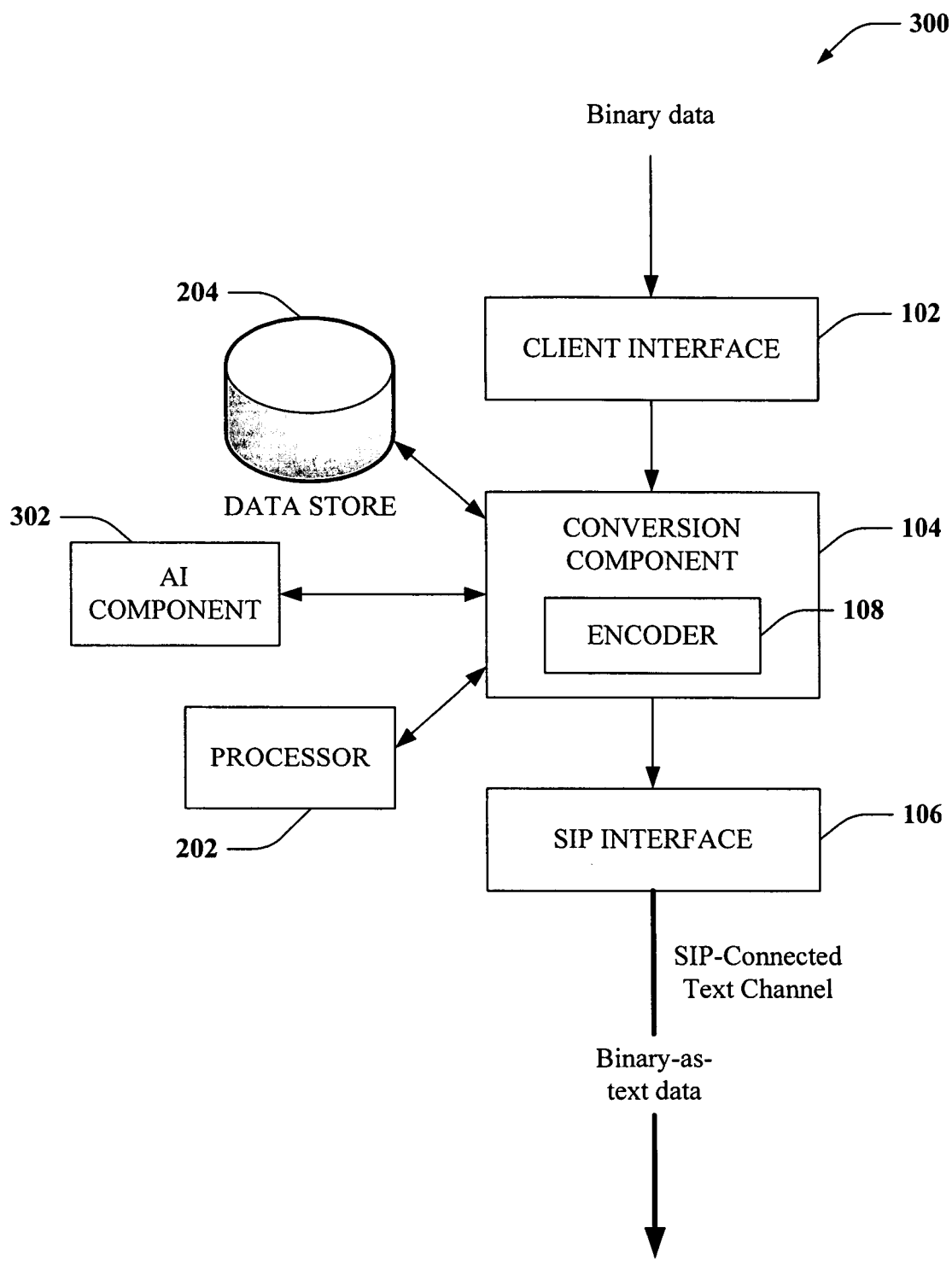
FIG. 3 is an illustration of a system 300 comprising an AI component, which facilitates transmitting binary data, file contents, etc., over a text communication channel.

Now turning to FIG. 3, as used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines, etc.) can be employed in connection with performing automatic and/or inferred action in connection with the subject invention.

FIG. 3 illustrates a system 300 that facilitates transmitting binary-as-text data over a text messaging system. The system 300 comprises a client interface 102 that receives data from a client for conversion and eventual transmission via an SIP channel as described with respect to FIG. 1. The system 300 further comprises a conversion component 104 that converts binary data to binary-as-text data in conjunction with an encoder 108, and an SIP interface 106 that interfaces with an SIP channel (e.g., SIP text channel, SIP information sideband channel, etc.) to transmit packaged binary-as-text data to a receiving client, as described supra. Additionally, the conversion component 104 can prefix a header to each binary-as-text packet, in addition to any header attached by the text messaging system. The binary-as-text data packets can be sent over the text messaging system via, for example, transmission control protocols that ensure serial transmission of the text packets. The conversion component 104 is operatively coupled to a processor 202 that analyzes data received and/or generated by the conversion component 104 and/or encoder 108, and a memory 204 that stores information associated with system operations, data conversion protocols, etc., as described with reference to FIG. 2.

Additionally, the conversion component 104 is associated with an AI component 302 that can make inferences regarding operation of the system 300. For example, the AI component 302 can infer a proper data packet size based on data associated with packet size constraints of a particular text messaging system over which the system 300 is transmitting and/or receiving binary-as-text data packets. According to another example, the AI component 302 can infer proper header instruction(s) for a protocol header to be affixed to a binary-as-text data packet, etc. According to yet another aspect, the AI component 302 can infer proper reconstruction protocols for interpreting binary-as-text data in the event that a character in a text packet is not immediately recognized by a receiving conversion component. The preceding examples are illustrative in nature, and are not intended to limit the scope of the manner in which the AI component 302 makes inferences or the number of inferences that can be made by the AI component 302.

Figure 4:
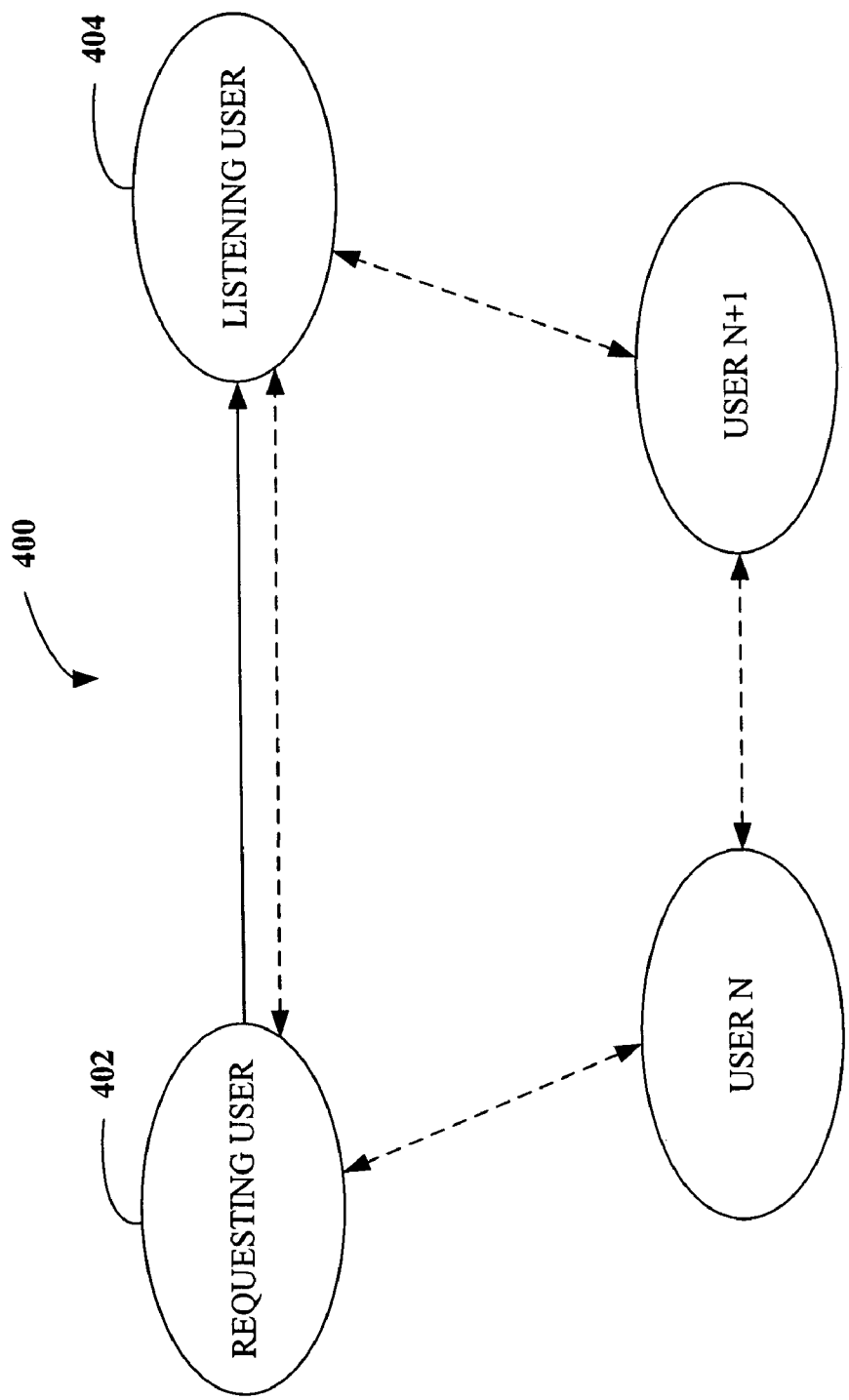
FIG. 4 is an illustration of a system 400 that facilitates transmitting binary data, files, etc., over a text communication channel.

FIG. 4 illustrates an exemplary user-initiated SIP session 400. As illustrated, a requesting user 402 initiates an SIP invite to a listening user 404, which, if accepted by the listening user 404 creates a communication channel. The users 402, 404 can then begin text messaging each other. Additionally or alternatively, an SIP information side-band channel (broken line) can be created to pass information without occupying significant bandwidth. Either or both of the text messaging system via which the users are communicating and/or the SIP information side-band channel can be employed to transmit and/or receive binary-as-text data. Users N and N+1 are presented to illustrate that any number of users (and/or clients) can be in communication via the text-messaging system and can transmit and/or receive binary-as-text data. Thus, the invention can provide significant data transmission volume while consuming minimal bandwidth.

While, for purposes of simplicity of explanation, the one or more methodologies shown herein, e.g., in the form of a flow chart, are shown and described as a series of acts, it is to be understood and appreciated that the present invention is not limited by the order of acts, as some acts can, in accordance with the present invention, occur in a different order and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the present invention.

Figure 5:
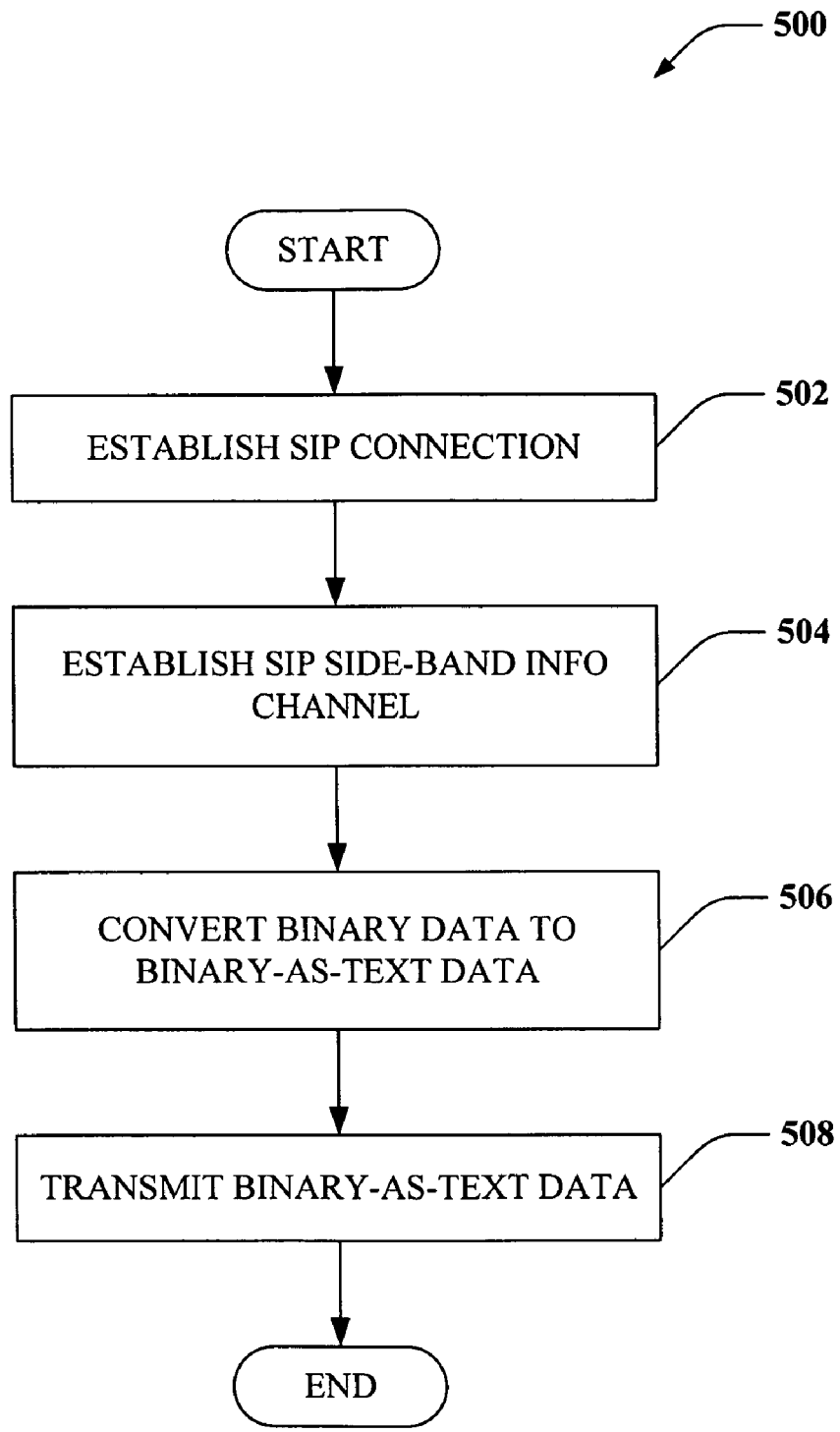
FIG. 5 is an illustration of a methodology 500 for transmitting binary data over an SIP information side-band channel.

FIG. 5 illustrates a methodology 500 for transmitting binary-as-text data over an SIP information side-band channel. At 502, an SIP connection can be established between at least two users. For example, a user (or user client) can submit a request to open a message system via a standard SIP, which if accepted, can create the SIP connection. It is to be appreciated that a plurality of users can be connected via SIP-connected message channels, and a server (not shown), can be employed to facilitate communication there between. Then, at 504, users can initiate an SIP information side-band channel over which data can be transmitted. At 506, binary data can be converted to binary-as-text data, and can be packaged according to SIP associated protocols and/or data packet size limitations. At 508, the binary-as-text packets can be serially transmitted over the SIP information side-band channel, for reconstruction as binary data at a receiving point. Thus, the methodology 500 can be built upon an existing text messaging system being utilized by at least two users, and can therefore take advantage of various protocols associated with the underlying text messaging system (e.g., predefined universal plug-and-play (UPNP) protocol(s) for firewall access to mitigate a need for creation of a new UPNP, security measures, bandwidth control, etc.).

Figure 6:
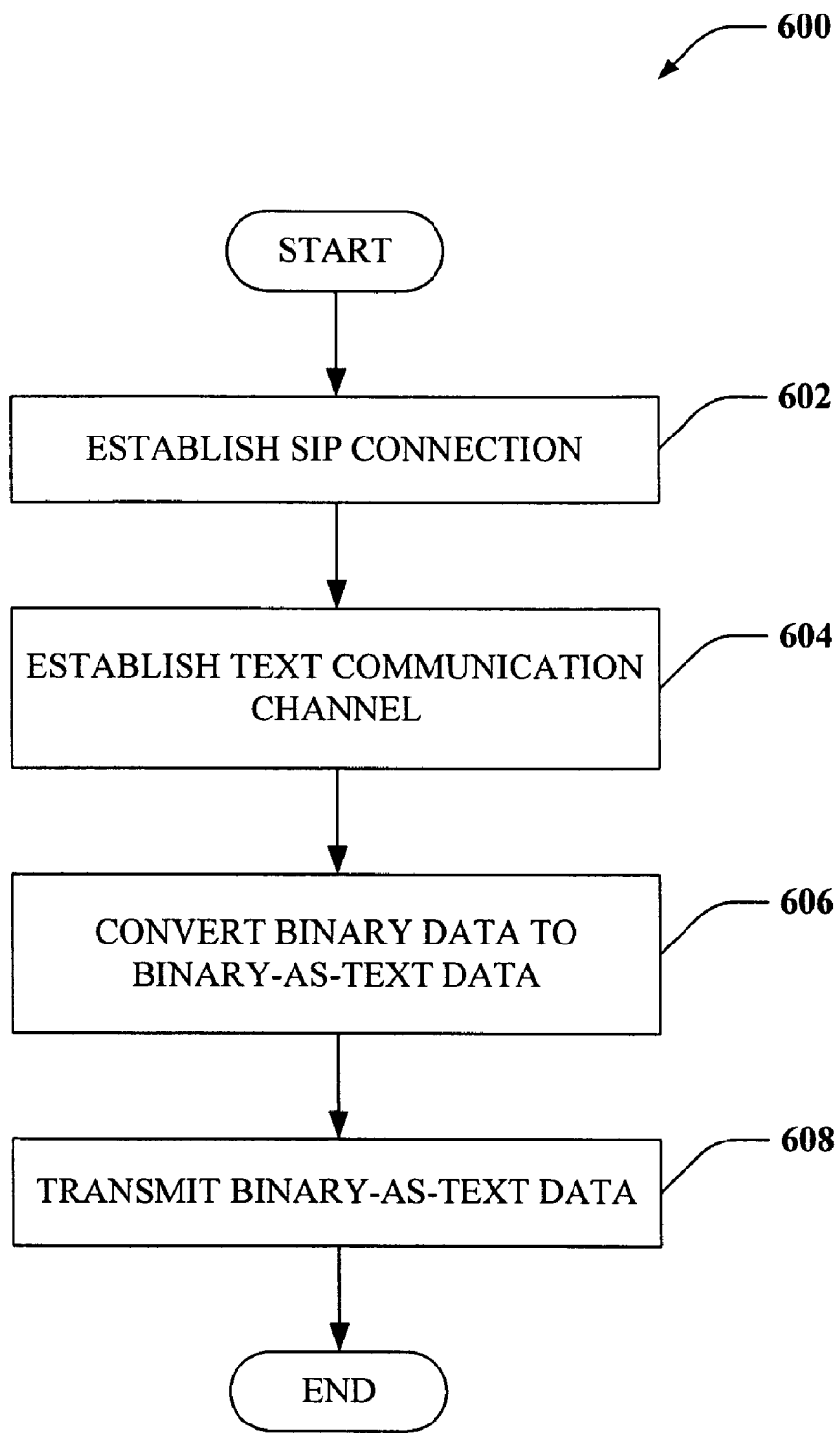
FIG. 6 is an illustration of a methodology 600 for transmitting binary data over a text communication channel.

FIG. 6 is an illustration of a methodology 600 for transmitting binary-as-text data over a text communications channel on a text messaging system. According to the figure, an SIP connection can be established between at least two users at 602. For example, a user (or user client) can request that a message system be opened with another user via a standard SIP, which if accepted by the other user (or user client), can result in the desired SIP connection. It is to be appreciated that a plurality of users can be connected via SIP-connected message channels, and a server (not shown), can be employed to facilitate communication there between. At 504, users can establish a text communication channel on a messaging system, such as an RTC engine. It is to be appreciated, however, that non-RTC engines can be employed and conversion protocols appropriately adjusted to effectuate the desired results of the present methodology, and that the method 600 is not limited to implementation in conjunction with an RTC engine alone. At 606, binary data can be converted to binary-as-text data, and can be packaged according to associated protocols as described herein with respect to FIG. 1. At 608, the binary-as-text packets can be serially transmitted (e.g., via implementation of standard TCPs, etc.) over the text communication channel on the messaging system for reconstruction as binary data at a receiving point. In this manner, the methodology 600 can be implemented over an existing text messaging system, and can conveniently usurp various protocols associated with the underlying text messaging system (e.g., predefined universal plug-and-play (UPNP) protocol(s) for firewall access, security measures, bandwidth control, etc.).

Figure 7:
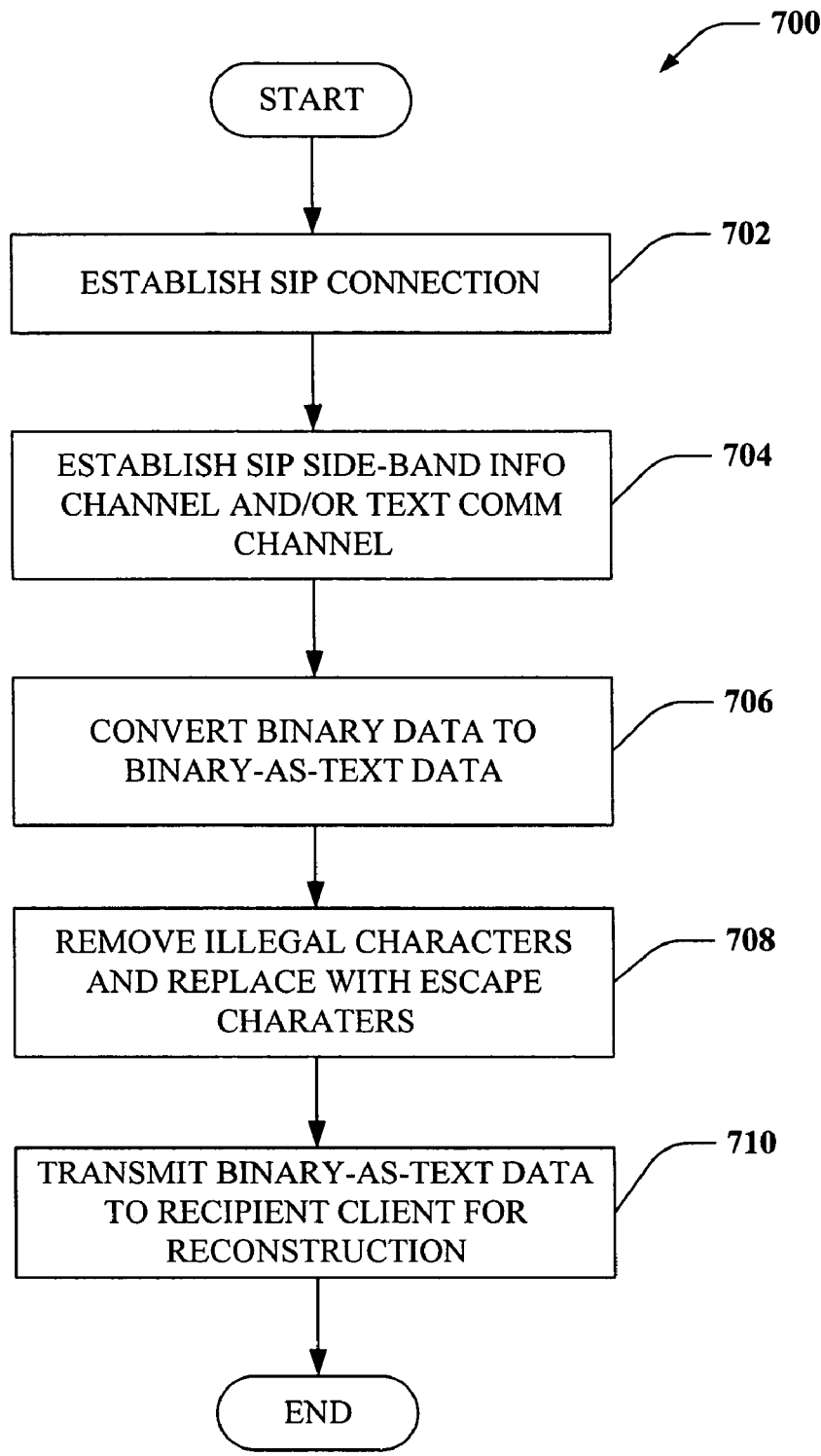
FIG. 7 is an illustration of a methodology 700 for transmitting binary data over a text communication channel and removing undesired characters.

FIG. 7 is an illustration of a methodology 700 for transmitting binary-as-text data over a text messaging system, wherein illegal characters in the binary-as-text data packets are replaced with escape characters. An SIP connection can be established at 702, and a text communication channel on a messaging system (e.g., RTC, non-RTC, conventional subscription-based messaging system, etc.) and/or an SIP sideband channel can be established at 704. At 706, binary data can be converted to binary-as-text data, and can be packaged according to associated protocols and data packet size limitations as described herein with respect to FIG. 1.

At 708, illegal characters (e.g., characters represented by binary values of 0, 10, 13, etc.) can be removed from the character stream and escaped with a particular escape character (e.g., "@," etc.). Such can be achieved via implementation of a Y-encoding technique or a variant thereof. In this manner, characters that can be misinterpreted and/or have an undesirable effect on a reconstructed binary-as-text data packet can be effectively mitigated. For example, the binary values 0, 10, and 13 are normally interpreted as "end of data," "return carriage," and "line feed," respectively, which can be escaped to prevent expression thereof in a binary-as-text data packet. Once undesired characters have been escaped, the binary-as-text packets can be serially transmitted (e.g., via implementation of standard TCPs, etc.) over the text communication channel on the messaging system and/or SIP sideband channel for reconstruction as binary data at a receiving point. Conversion of the serially transmitted binary-as-text data packets into binary data that can be employed to reconstruct a data file, etc., can be executed in a manner that approximates a reversal of the manner in which the described systems and methodologies convert and package binary data into binary-as-text data.

Figure 8:
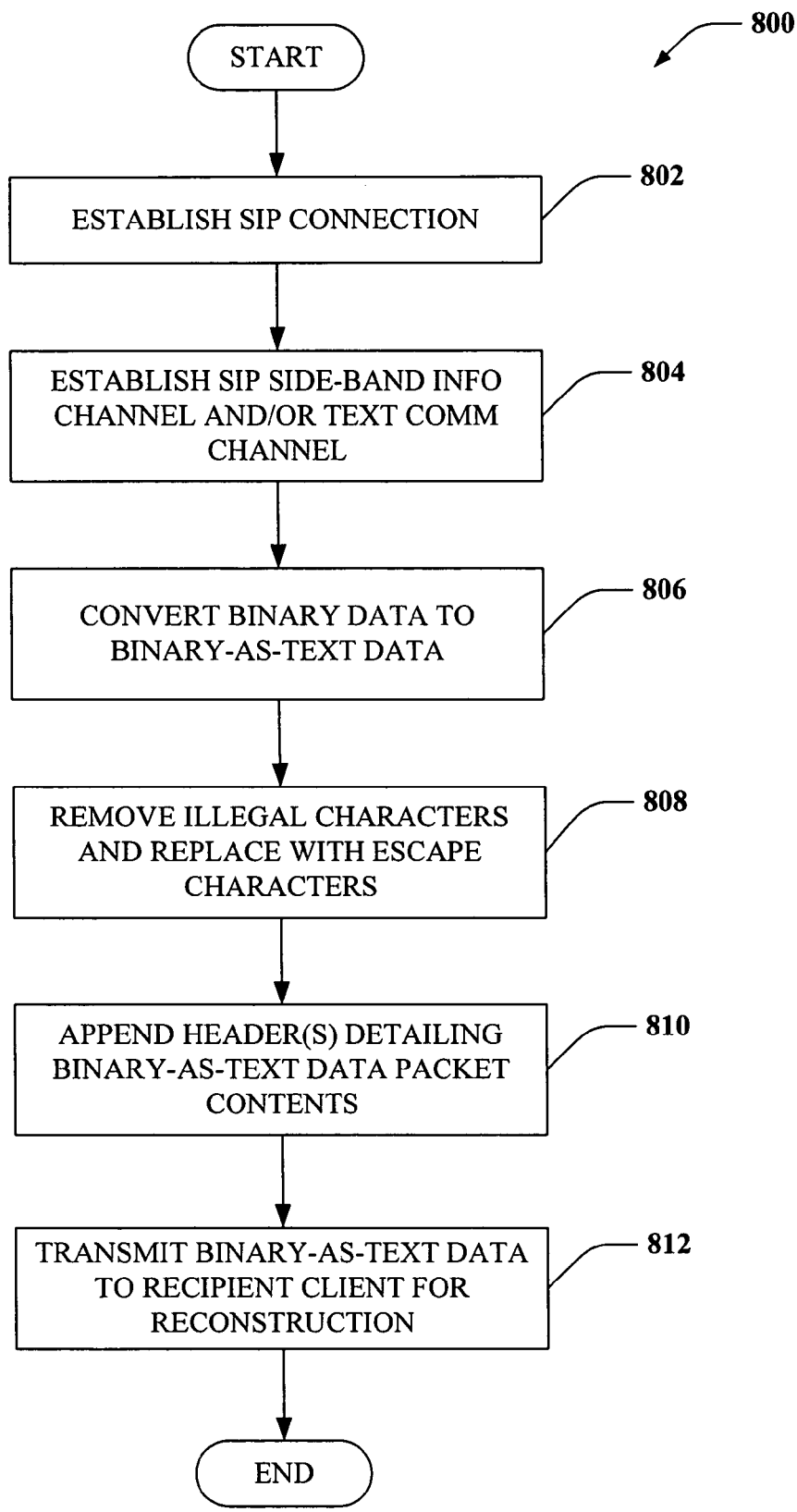
FIG. 8 is an illustration of a methodology 800 for transmitting binary data packets over a text communication channel and providing headers to indicate data packet content.

FIG. 8 illustrates a methodology 800 for transmitting binary-as-text data over a text messaging system, wherein headers describing the binary-as-text data packets can be prepended to the data packets to permit identification of the data type and/or contents by a receiving client. An SIP connection can be established at 802, and a text communication channel on a messaging system (e.g., RTC, non-RTC, conventional subscription-based messaging system, etc.) and/or an SIP side-band channel can be established at 804. At 806, binary data can be converted to binary-as-text data and packaged according to size-limiting protocols associated with the text channel as described herein with respect to FIG. 1. At 808, illegal characters (e.g., characters represented by binary values of 0, 10, 13, etc.) can be removed from the character stream and escaped with a particular escape character (e.g., "@," etc.).

At 810, a header containing information related to the type of information contained in the data packet (e.g., binary-as-text, etc.), and any other relevant information (e.g., data string length, packet number and/or position in a stream of serially transmitted packets, etc.), can be appended to facilitate interpretation of the data packet(s) by a receiving client. In this manner, a receiving client can identify the data packet(s) and initiate appropriate translation protocols in order to reconstruct the binary data, data file contents, etc., originally converted for transmission. Additionally, the header can comprise information to indicate whether binary-as-text data follows or whether actual text data follows. Finally, the data packets can be transmitted to a receiving client over the SIP INFO side-band channel or the TEXT channel of an SIP-connected messaging system at 812, after which the data can be read and employed by the receiving client to reconstruct the original data file.

Figure 9:
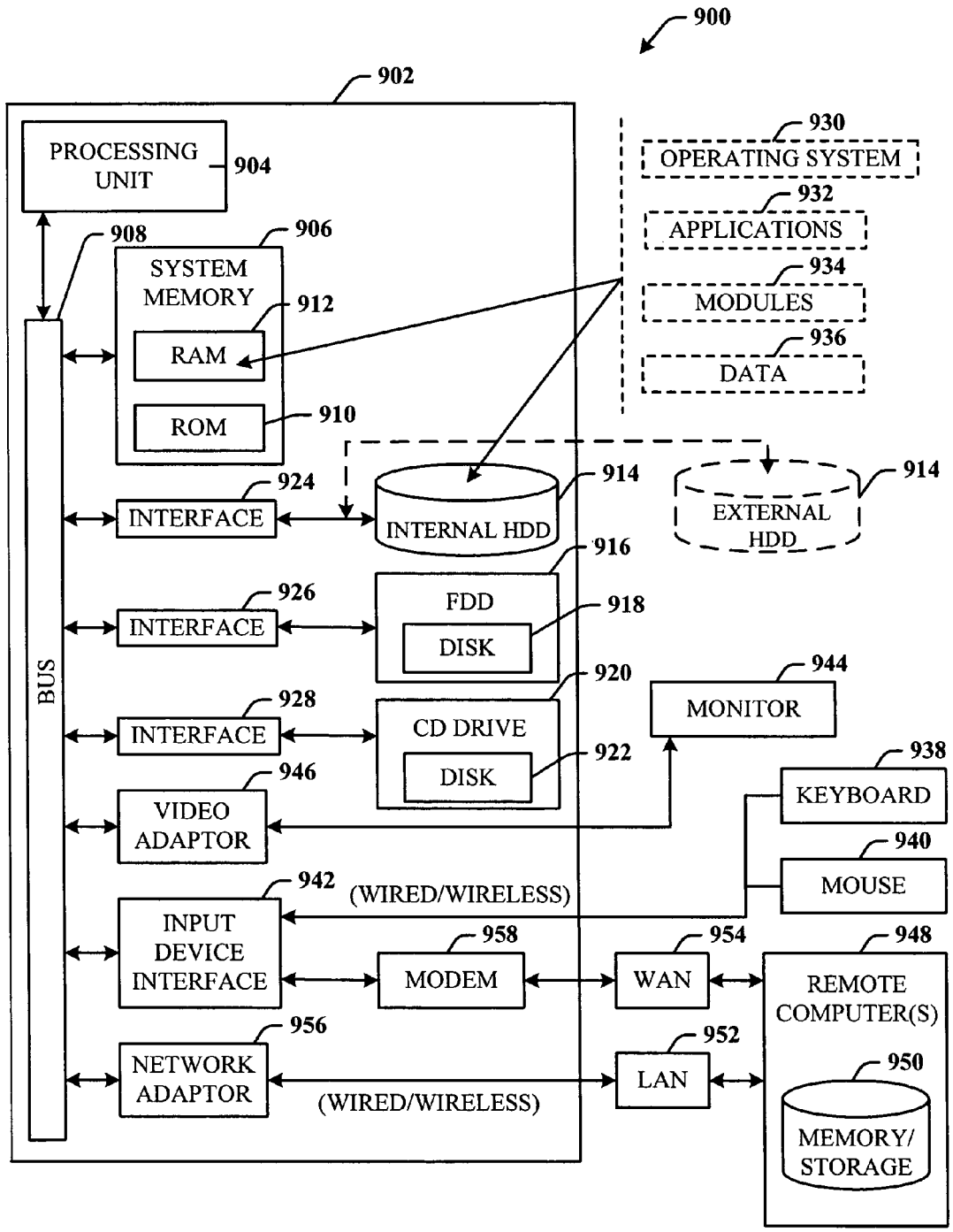
FIGS. 9 and 10 illustrate exemplary computing environments in accordance with various aspects of the present invention.

Referring now to FIG. 9, there is illustrated a block diagram of a computer operable to execute the disclosed architecture. In order to provide additional context for various aspects of the present invention, FIG. 9 and the following discussion are intended to provide a brief, general description of a suitable computing environment 900 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference again to FIG. 9, there is illustrated an exemplary environment 900 for implementing various aspects of the invention includes a computer 902, the computer 902 including a processing unit 904, a system memory 906 and a system bus 908. The system bus 908 couples system components including, but not limited to, the system memory 906 to the processing unit 904. The processing unit 904 may be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up.

The computer 902 further includes a hard disk drive 914, a magnetic disk drive 916, (e.g., to read from or write to a removable disk 918) and an optical disk drive 920, (e.g., reading a CD-ROM disk 922 or to read from or write to other high capacity optical media such as Digital Video Disk (DVD)). The hard disk drive 914, magnetic disk drive 916 and optical disk drive 920 can be connected to the system bus 908 by a hard disk drive interface 924, a magnetic disk drive interface 926 and an optical drive interface 928, respectively. The drives and their associated computer-readable media provide nonvolatile storage of data, data structures, computer-executable instructions, and so forth. For the computer 902, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 912, including an operating system 930, one or more application programs 932, other program modules 934 and program data 936. It is appreciated that the present invention can be implemented with various commercially available operating systems or combinations of operating systems.

A user can enter commands and information into the computer 902 through a keyboard 938 and a pointing device, such as a mouse 940. Other input devices (not shown) may include a microphone, an IR remote control, a joystick, a game pad, a satellite dish, a scanner, or the like. These and other input devices are often connected to the processing unit 904 through a serial port interface 942 that is coupled to the system bus 908, but may be connected by other interfaces, such as a parallel port, a game port, a universal serial bus ("USB"), an IR interface, etc. A monitor 944 or other type of display device is also connected to the system bus 908 via an interface, such as a video adapter 946. In addition to the monitor 944, a computer typically includes other peripheral output devices (not shown), such as speakers, printers etc.

The computer 902 may operate in a networked environment using logical connections via wired and/or wireless communications to one or more remote computers, such as a remote computer(s) 948. The remote computer(s) 948 may be a workstation, a server computer, a router, a personal computer, portable computer, microprocessor-based entertainment appliance, a peer device or other common network node, and typically includes many or all of the elements described relative to the computer 902, although, for purposes of brevity, only a memory storage device 950 is illustrated. The logical connections depicted include a local area network (LAN) 952 and a wide area network (WAN) 954. Such networking environments are commonplace in offices, enterprise-wide computer networks, intranets and the Internet.

When used in a LAN networking environment, the computer 902 is connected to the local network 952 through a wired or wireless communication network interface or adapter 956. The adaptor 956 may facilitate wired or wireless communication to the LAN 952, which may also include a wireless access point disposed thereon for communicating with the wireless adaptor 956. When used in a WAN networking environment, the computer 902 typically includes a modem 958, or is connected to a communications server on the LAN, or has other means for establishing communications over the WAN 954, such as the Internet. The modem 958, which may be internal or external and a wired or wireless device, is connected to the system bus 908 via the serial port interface 942. In a networked environment, program modules depicted relative to the computer 902, or portions thereof, may be stored in the remote memory storage device 950. It will be appreciated that the network connections shown are exemplary and other means of establishing a communications link between the computers may be used.

The computer 902 is operable to communicate with any wireless devices or entities operably disposed in wireless communication, e.g., a printer, scanner, desktop and/or portable computer, portable data assistant, any piece of equipment or location associated with a wirelessly detectable tag (e.g., a kiosk, news stand, restroom), and telephone. This includes at least Wi-Fi and Bluetooth™ wireless technologies. Thus the communication may be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11b) or 54 Mbps (802.11a) data rate or with products that contain both bands (dual band), so the networks can provide real-world performance similar to the basic 10BaseT wired Ethernet networks used in many offices.

The disclosed computer 902 may also be employed with HiperLAN technology. HiperLAN is a set of wireless local area network (WLAN) communication standards primarily used in European countries. There are two specifications: HiperLAN/1 and HiperLAN/2, both of which have been adopted by the European Telecommunications Standards Institute. The HiperLAN standards provide features and capabilities similar to those of the IEEE 802.11 WLAN standards used in the U.S. and other adopting countries. HiperLAN/1 provides communications at up to 20 Mbps in the 5-GHz range of the radio frequency spectrum. HiperLAN/2 operates at up to 54 Mbps in the same RF band, and is compatible with 3G (third-generation) WLAN systems for sending and receiving data, images, and voice communications. HiperLAN/2 has the potential, and is intended, for implementation worldwide in conjunction with similar systems in the 5-GHz RF band.

Figure 10:
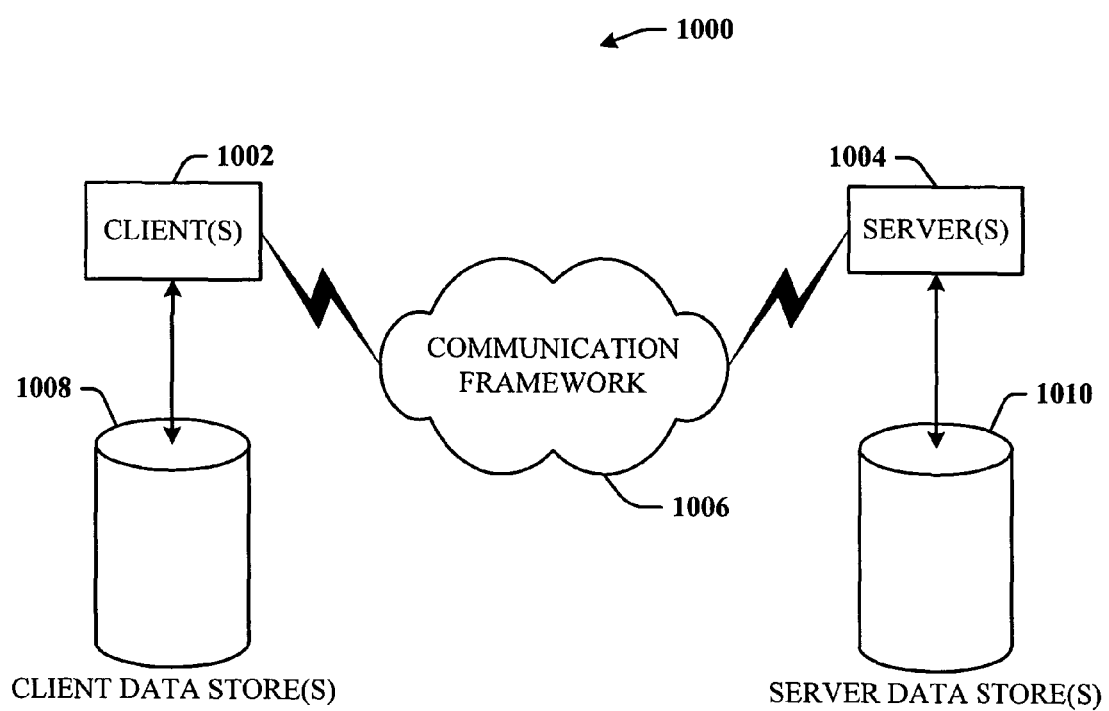

Referring now to FIG. 10, there is illustrated a schematic block diagram of an exemplary computing environment 1000 in accordance with the present invention. The system 1000 includes one or more client(s) 1002. The client(s) 1002 can be hardware and/or software (e.g., threads, processes, computing devices). The client(s) 1002 can house cookie(s) and/or associated contextual information by employing the present invention, for example. The system 1000 also includes one or more server(s) 1004. The server(s) 1004 can also be hardware and/or software (e.g., threads, processes, computing devices). The servers 1004 can house threads to perform transformations by employing the present invention, for example. One possible communication between a client 1002 and a server 1004 may be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications may be facilitated via a wired (including optical fiber) and/or wireless technology. The client(s) 1002 are operably connected to one or more client data store(s) 1008 that can be employed to store information local to the client(s) 1002 (e.g., cookie(s) and/or associated contextual information). Similarly, the server(s) 1004 are operably connected to one or more server data store(s) 1010 that can be employed to store information local to the servers 1004.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates transmission of binary information across text communication channels in real time, comprising:
    a conversion component that converts binary multimedia data into a text format, and parses the converted binary multimedia data into packets for serial transmission;
    an encoder contained within the conversion component that encodes the binary multimedia data in the text format in accordance with ASCII protocols, wherein the encoder removes illegal characters from the text-formatted data and replaces removed illegal characters with an escape character, and wherein the illegal characters comprise non-alphanumeric characters represented numerically;
    a SIP-connected messaging system that permits serial transmission of the converted binary multimedia data packets via a text channel in the SIP-connected messaging system; and
    an artificial intelligence (AI) component to infer reconstruction protocols for interpreting the converted binary multimedia data in the event that the packets are not recognized by a receiving conversion component.

2. The system of claim 1, wherein the non-alphanumeric illegal characters are represented numerically by a decimal value of 0, 10, or 13.

3. The system of claim 2, wherein 0 represents end-of-data, 10 represents line-feed, and 13 represents carriage return.

4. The system of claim 1, wherein the escape character is the "@" symbol, which has a decimal value of 64.

5. The system of claim 1, the conversion component prefixes the transmitted converted binary multimedia data packet with a protocol header that is distinct from any header attached by the messaging system.

6. The system of claim 5, the protocol header describes the contents of the converted binary multimedia data packet to permit a receiving client to distinguish the transmitted data packet from other types of data packets.

7. The system of claim 1, the SIP-connected messaging system permits serial transmission of converted binary data packets via an information side-channel in the SIP-connected messaging system.

8. The system of claim 7, the converted binary multimedia data comprises binary-as-text data.

9. The system of claim 8, the binary-as-text data comprises information related to at least one of a multimedia binary data file, a cell phone ringer, a cell phone background, a text-channel gaming application, and a user's file contents.

10. A method for transmitting binary multimedia data over a text messaging channel, comprising:
    establishing a SIP connection between a first user and a second user;
    establishing a SIP-connected messaging channel between the first and the second user;
    converting the binary multimedia data from the first user into binary-as-text multimedia data employing an ASCII conversion of binary data values;
    removing at least one undesired character in a text-formatted data string, the removed character comprises non-alphanumeric characters represented numerically;
    affixing an escape character in place of the at least one removed character in the data string;
    parsing the binary-as-text multimedia data into packets for serial transmission to the second user;
    transmitting the packets from the first user to the second user via the SIP-connected messaging channel; and
    inferring reconstruction protocols for interpreting the binary-as-text multimedia data in the event that the packets are not recognized by the second user.

11. A computer-readable medium comprising computer-executable instructions to perform the method of claim 10.

12. The method of claim 11, wherein the SIP-connected messaging channel is a text channel of an SIP-connected messaging system.

13. The method of claim 10, wherein the SIP-connected messaging channel is a SIP information side-band channel.

14. The method of claim 10, wherein the multimedia data packet size is approximately 2 kilobytes or less.

15. The method of claim 10, further comprising prefixing a header to a data packet, wherein the header comprises information related to the type of multimedia data contained in the data packet.

16. The method of claim 10, wherein binary file contents are reconstructed from received binary-as-text multimedia data at a client employed by the second user.

17. A system embodied on a computer readable storage medium that facilitates transmission of binary multimedia data over a text communication channel, comprising:
    means for creating a SIP-connected text messaging channel;
    means for converting binary multimedia data into binary-as-text data and packaging the binary as text data employing an ASCII conversion of binary multimedia data values;
    means for removing at least one undesired character in a text formatted data string, the removed character comprises non-alphanumeric characters represented numerically;
    means for substituting an escape character for the at least one removed character in the data string;
    means for parsing the binary-as-text data into packets for serial transmission;
    means for transmitting the packets over the SIP-connected text messaging channel;
    means for inferring reconstruction protocols for interpreting the binary-as-text data in the event that the packets are not recognized by a receiving component; and
    means for inferring proper data packet size based on the SIP-connected text messaging channel.

18. The system of claim 17, further comprising means for removing undesired characters from the binary-as-text multimedia data prior to transmission.

19. The system of claim 17, further comprising means for prefixing a header to at least one data packet containing binary-as-text data.

* * * * *